United States Patent [19]

Hetrick

[11] 4,435,742

[45] Mar. 6, 1984

[54] ELECTROCHEMICAL TRANSISTOR STRUCTURE WITH TWO SPACED ELECTROCHEMICAL CELLS

[75] Inventor: Robert E. Hetrick, Dearborn Heights, Mich.

[73] Assignee: Ford Motor Company, Dearborn, Mich.

[21] Appl. No.: 344,891

[22] Filed: Feb. 1, 1982

Related U.S. Application Data

[63] Continuation-in-part of Ser. No. 117,176, Jan. 31, 1980, Pat. No. 4,332,003.

[51] Int. Cl.³ .......................... H01G 9/00; B01J 17/00; H01G 9/18
[52] U.S. Cl. .................................... 361/433; 361/434; 361/435; 429/191; 29/570
[58] Field of Search ....................... 361/433, 434, 435; 204/195 S; 29/570

[56] References Cited

U.S. PATENT DOCUMENTS

| | | | |
|---|---|---|---|
| 3,679,945 | 7/1972 | Sekido et al. | 361/433 |
| 3,701,930 | 10/1972 | Tami | 361/433 |
| 3,801,479 | 4/1974 | Nishino et al. | 361/433 |
| 3,881,957 | 5/1975 | Hausier | 361/433 |
| 4,038,586 | 7/1977 | Sekido et al. | 361/433 |
| 4,107,019 | 8/1978 | Takao et al. | 361/433 |
| 4,161,013 | 7/1979 | Grodzinsky | 361/433 |
| 4,163,982 | 8/1979 | Didomenico | 361/433 |
| 4,187,161 | 2/1980 | Fisher | 361/433 |
| 4,187,530 | 2/1980 | Singh et al. | 361/433 |
| 4,332,003 | 5/1982 | Abtrick | 361/433 |

*Primary Examiner*—Andrew J. James
*Attorney, Agent, or Firm*—Peter Abolins; Clifford L. Sadler

[57] ABSTRACT

This specification discloses an electrochemical structure having two separate electrochemical cells using liquid electrolytes separated by a material or region which ca take up the electrochemically active species appropriate to the cells in neutral form. Combined with external circuitry, the structure can be made to exhibit transistor action and further can be made to show ac voltage, current and power gain. For example, transistor action occurs with a structure composed of two liquid electrochemical cells using a sulfuric acid electrolyte separated by an enclosed volume. In normal operation, one cell, acting as an emitter, emits hydrogen from a hydrogen ambient into the enclosed volume, which acts as a base region, where it is collected and returned to the ambient by the opposing cell, acting as a collector.

5 Claims, 14 Drawing Figures

ELECTROCHEMICAL TRANSISTOR STRUCTURE WITH TWO SPACED ELECTROCHEMICAL CELLS

This is a continuation-in-part of Ser. No. 117,176 filed on Jan. 31, 1980 now U.S. Pat. No. 4,332,003.

BACKGROUND OF THE INVENTION (1) Field of the Invention

This invention relates to three terminal devices that are electrochemical analogs of conventional semiconductor junction transistors. With standard external circuitry, the devices can be used to perform electrical functions common to semiconductor transistors such as ac voltage, current and power amplification.

(2) Prior Art

Transistor action is known where a species electrically emitted or generated in one region of a medium controls current drawn or collected from a nearby region. The species involved need not be limited to electrons and holes in semiconductors as was shown by Letaw and Bardeen (Journal of Applied Physics, Volume 25, No. 5, page 600, May, 1954) who constructed an electrochemical analog of a junction transistor transistor using various oxidation-reduction couples in liquid electrolytes. Because of the use of liquid electrolytes, such devices can only be used over a limited range of operating conditions such as a normal atmospheric environment and temperatures.

Resistors, capacitors and transistors are examples of electrical components which have certain standard characteristics. A certain type of electrical input to the component is expected to produce a characteristic type of output. Many varieties of a given component may produce the same input-output transformation, such as, an air gap and an electrolytic capacitor. The need for using variations of a given component arises because a certain type of component may not allow sufficient range of electrical operation, sufficient durability, ability to withstand ambient conditions, etc. The variations of the given component can embody considerable differences in the chemical or physical principles of operation, in addition to differences in fabrication procedure and physical appearance. For example, two types of semiconducting devices are bipolar and field-effect transistors. In this light, the device discussed by Letaw and Bardeen is just one structure for electrochemically obtaining transistor action. Electrochemical conduction is discussed in more detail below.

Figure 1:
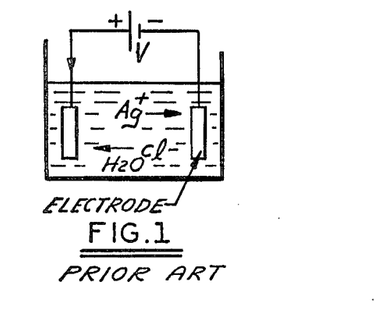
FIG. 1 is a diagram illustrating the operation of a prior art electrolytic cell wherein two electrodes are placed in a liquid and connected to each other through a battery thereby causing ionic conduction.

In an ionic conductor (electrolyte), a charged form of an atom (an ion) is transported through the electrolyte toward an electrode under the action of an electric potential applied to the electrode by an external battery. Many electrolytes are liquids, like water, into which salts, like silver chloride are dissolved, producing ionic species, like $Ag^+$ and $Cl^-$. Referring to FIG. 1, a voltage applied between metal electrodes causes the ions to move in the liquid.

Many different ionic species can be transported in water. The ions can be used up, in the sense that $A_g$ will "plate out" on the negative electrode and $Cl_2$ will be evolved at the positive electrode.

Figure 2:
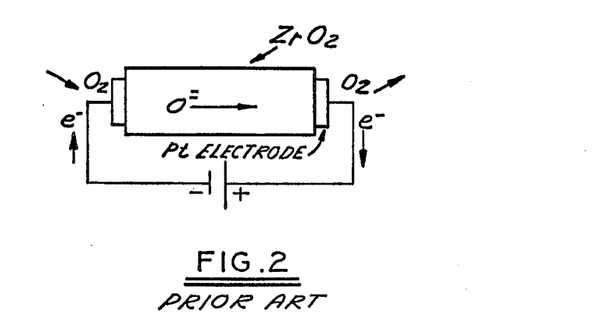
FIG. 2 is a diagram of ionic conduction across a solid electrolyte between opposing electrodes connected to opposite terminals of a battery, in accordance with prior art.

There are also solid electrolytes which usually conduct only a single ionic species. For example, doped $ZrO_2$ conducts $O^=$, the negatively ionized form of oxygen, as shown in FIG. 2. Porous platinum electrodes are attached to opposite ends of ceramic $ZrO_2$. At least one of the electrodes must be surrounded by the neutral form of the conducting atom (oxygen in this case). For zirconium dioxide this is accomplished by placing the "cell" in an atmosphere containing oxygen, such as air. At the negative electrode, gaseous oxygen combines with electrons from the battery to form oxygen ions ($O^=$) in the zirconium dioxide according to the following equation:

$$O_2(gas) + 4e^-(electrode) \rightarrow 2O^=(electrolyte) \qquad (1)$$

The $O^=$ ions are transported across the zirconium dioxide and expelled to the ambient atmosphere at the positive electrode as oxygen molecules. The electrons are given back to the electrode where they can flow back to the positive terminal of the battery and complete the current loop. The process is described by the following equation:

$$2O^=(electrolyte) \rightarrow 4e^-(electrode) + O_2(gas) \qquad (2)$$

With zirconium dioxide, gaseous oxygen is transported from one side of the electrolyte to the other. This cell is sometimes called an oxygen pump, and could be used to generate a partial vacuum or overpressure if the regions around the electrodes were sealed off.

Figure 3:
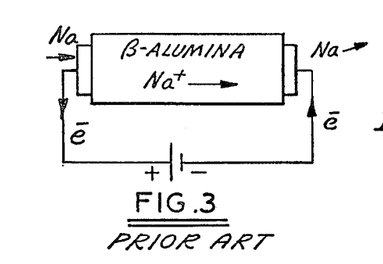
FIG. 3 is a similar to FIG. 2 using a particular embodiment of a sodium ion conductor.

For a sodium beta alumina solid electrolyte, sodium atoms from a liquid or gaseous sodium reservoir would be transported as shown in FIG. 3. At the electrodes the following reactions would occur:

Positive electrode:

$$Na(reservoir) \rightarrow Na^+(electrolyte) + e^-(electrode) \qquad (3)$$

Negative electrode:

$$Na^+(electrolyte) + e^-(electrode) \rightarrow Na(reservoir) \qquad (4)$$

This electrochemical behavior would eventually deplete the reservoir of Na surrounding the positive electrode. For continued operation, a means would be necessary to recirculate the Na. One possibility would be to completely immerse the cell in liquid or gaseous Na.

Discussing transistor action in more detail, a semiconductor transistor is a 3-terminal device having regions next to the terminals called the emitter, base and collector for bipolar (n-p-n, p-n-p) transistors. The corresponding regions for a field-effect transistor (FET) would be called source, gate, and drain, respectively.

Figure 4:
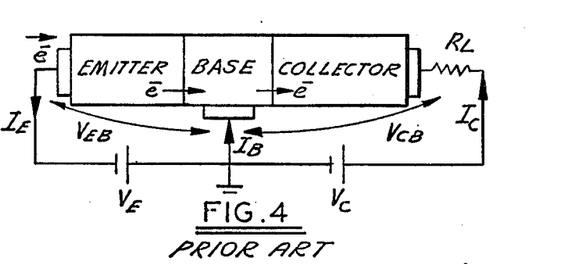
FIG. 4 is a schematic diagram showing transistor action in the common base configuration.

There are three conventional modes of attaching external circuitry to the transistor. These are the common-base (CB), common-emitter (CE), and common collector (CC) modes. Each mode could be used to describe "transistor action". FIG. 4 illustrates the CB configuration.

A battery $V_E$ (usually called a "bias") is applied between the emitter and base terminals with a polarity (forward-bias) to force the electrically active species into the emitter and then into the base region as well. For a semiconducting transistor, the active species are electrons. An emitter current, $I_E$, now flows out of the emitter terminal.

A battery $V_c$ is applied to the collector and base terminals through a load resistor $R_L$. The polarity of the battery is such as to withdraw electrons from the collector (reverse bias) resulting in a collector current $I_c$.

As a result, with the collector bias on, most of the electrons emitted into the base do not flow out of the base lead (terminal) to be registered as a base current $I_B$ (i.e., $I_B << I_E$). Rather, most emitted electrons pass through the base and are collected by the collector so that $I_c \sim I_E$.

Figure 5:
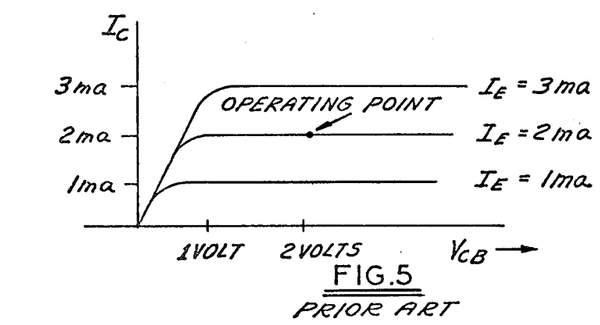
FIG. 5 is a graphical representation of collector characteristics for a transistor depicted on an axis representing the collector-base voltage and an axis representing the collector current.

Further, the characteristics of the emitter-base-collector interfaces are such that increasing the collector bias does not increase the flow of either collector or emitter currents after a certain point. Rather, the collector current "saturates" at approximately the same value as the emitter current. These two features lead to a family of curves called the "collector characteristic" which is shown in FIG. 5, where $V_{CB}$ is the collector-base voltage and can be increased by increasing $V_c$. Each curve represents the collector current that flows when the collector bias is increased for a series of fixed values of $I_E$. Note that the collector current saturates at approximately the same value as the emitter current.

Figure 6:
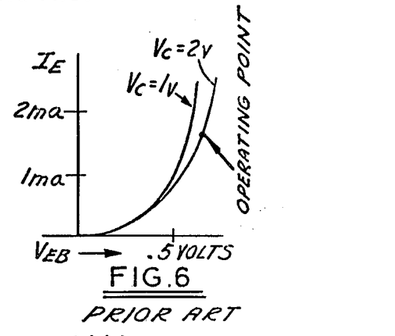
FIG. 6 is a graphical representation of transistor emitter characteristics represented on an axis of emitter-base voltage versus an axis of emitter current.

Concurrently, one could specify the "emitter characteristic" as in FIG. 6 where $I_E$ is plotted against $V_{EB}$ ($=V_E$ in this case) for various values of $V_{CB}$. Whereas collector current saturation is the essential feature of the collector characteristic, the essential feature of the emitter characteristic is that at least for some range of $V_{EB}$, the emitter-base impedance is low so that a small change in $V_{EB}$ gives a large change in $I_E$. A device with collector and emitter characteristics which exhibit these essential features when connected in the CB configuration can be said to exhibit transistor action. If the device were wired in the CE or CC configurations, similar characteristic curves could be described which could be used to specify transistor action.

There are many uses for transistors, but a common one is a voltage amplifier. Adjusting $V_{c\,1\,and}\,V_E$ so that an operating point is established is shown by the dots on FIGS. 5 and 6. If an additional voltage source (the signal) produces a small change $\Delta V_{EB}$ in $V_{EB}$ about the emitter operating point, corresponding changes will occur in $I_E$, $I_C$ and $V_{CB}$. One can show that if $R_L$ is sufficiently large, then $\Delta V_{CB} > > \Delta V_{EB}$ and the signal voltage has been amplified in the collector-base circuit. This can be achieved if the emitter and collector characteristics are like those of FIGS. 5 and 6. Current or current and voltage amplification can be achieved using the other modes of operation.

Figure 7:
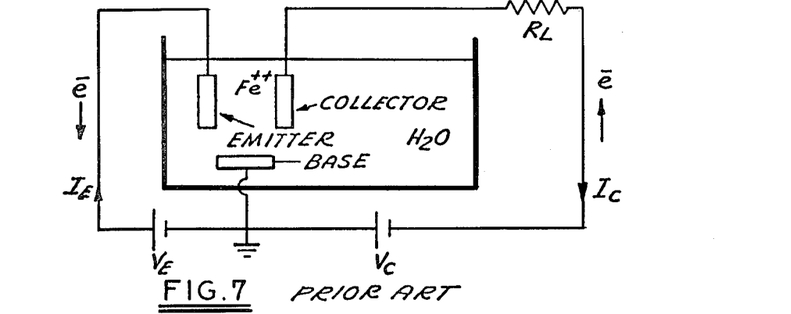
FIG. 7 is a schematic representation of the Letaw-Bardeen device wherein three electrodes are placed within a liquid electrolyte.

Referring to FIG. 7 which illustrates the Letaw and Bardeen device, a beaker contains water and several dissolved chemicals as well as metal electrodes. As an example, let the chemicals be such that there is a great abundance of $Fe^{++}$ ions in solution. The metal electrodes will be called the emitter, base, and collector as shown. When the emitter-base electrodes are "forward biased" by $V_E$, the $Fe^{++}$ (ferrous) ions present in great abundance are converted to $Fe^{+++}$ (ferric) ions near the emitter electrode according to the reaction $Fe^{++} \rightarrow Fe^{+++}$ (solution) $+ e^-$ (electrode), and results in a current flow $I_E$.

Normally the $Fe^{+++}$ ions would start to diffuse away from the emitter region toward the base electrode where they would be reconverted back to $Fe^{++}$ ions, according to $Fe^{+++}$ (solution) $+ e^-$ (electrode) $\rightarrow Fe^{++}$ (solution) and resulting in a large base current $I_B$. To defeat this and achieve "transistor action" however, the collector electrode is placed much closer to the emitter electrode than the base is. The collector is "reverse-biased" by $V_C$ and nearly all of the emitted $Fe^{+++}$ ions are converted back to $Fe^{++}$ ions at the collector before they can reach the base (so that $I_C \sim I_3 > > I_B$). This process will result in emitter and collector characteristics similar to those in FIGS. 5 and 6. The key to the device is placing the collector much closer to the emitter than the base. As the paper of Letaw and Bardeen shows, this concept can be made to work with a variety of dissolved chemical species in water. The concept of Letaw and Bardeen uses a single continuous liquid electrolyte into which three electrodes are placed, one being associated with the base, emitter and collector. This disclosure described an electrochemical structure by which transistor action can be achieved using two physically separate liquid electrolytes.

SUMMARY OF THE INVENTION

The following describes a concept and gives examples for achieving transistor action using electrochemical structures which employ two separate electrochemical cells using liquid electrolytes arranged in a particular manner with additional structure defining an enclosed region between the cells which can take up or release the active chemical species in neutral form. Combind with standard external circuitry, such devices may be used to perform the same type of electrical functions as conventional semiconductor transistors. Such functions would include electrical current, voltage and power amplification. In accordance with an embodiment of this invention, the electrochemical systems (a system would include the specific electrolyte, the appropriate neutral and ionic forms of the active atomic species, electrode materials, and other attendant accessories) to which it may apply are quite varied. This is meant in the same sense that the concept for achieving a bipolar junction transistor may be applied to a great number of semiconducting materials or systems.

Of particular importance, the circumstances such as temperature and ambient environment under which such devices can operate may be extreme and well outside the ranges allowable for the operation of conventional semiconductor transistors or the liquid electrochemical devices described by Letaw and Bardeen. Accordingly, such device may find unique and useful application under these extreme conditions. For example, a zirconium dioxide device described below can be operated at temperatures as high as about 1000° C. in gaseous environments containing oxygen such as may be found in an automobile exhaust. Other devices made from sodium beta alumina could operate in high temperature corrosive environments containing liquid sodium or sodium vapor.

In accordance with an embodiment of this invention, an electrochemical analog transistor has a collector region, an emitter region and a base region. The collector and emitter regions are separately composed of electrolytes and attached or inserted electrodes that form electrochemical cells which in response to an applied voltage will conduct an appropriate active atomic species in ionized form. The base region is a material or region adapted for taking up the active species in its electrically neutral form.

In accordance with an embodiment of this invention, the collector and emitter cells are composed of an ionically conducting liquid electrolyte such as dilute sulfuric acid having therein a pair of spaced (inner and outer) Pt electrodes. A glass container can be used to hold the electrolyte. The base region, which must take up hydrogen molecules (tne neutral form of the active species), can be an enclosed volume defined by a hollow glass tube whose open ends are immersed in the sulfuric acid of the emitter and collector cells. One electrode from each cell (inner electrodes) is positioned within the enclosed volume so as to contact the sulfuric acid. Lead wires are attached to the electrodes so that external circuitry can be connected to the cells.

In general, the device is placed (or additional structure built) so that a reservoir containing a large concentration of the active species in neutral form is in contact with the outer electrode of each cell. For a sulfuric acid electrolyte device, this can be accomplished by positioning a glass container over each of the outer electrodes to contain a reservoir of hydrogen molecules.

The operating conditions, appearance and characteristics of devices using different electrochemical systems can be quite varied and still be embodiments in accordance with this invention. It can further be appreciated that the physical processes involved in a transistor in accordance with an embodiment of this invention are quite different from the above-described Letaw-Bardeen device.

DETAILED DESCRIPTION OF THE INVENTION

Figure 8A:
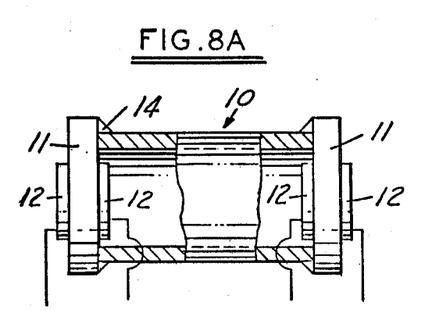
FIG. 8A is a schematic diagram of an electrochemical transistor in accordance with an embodiment of this invention.

Referring to FIG. 8A, transistor action in an electrochemical structure 10 can be obtained by employing a solid electrolyte. Structure 10 has two electrochemical cells in the form of disks 11 of ceramic zirconium dioxide doped with 8 mole percent $Y_2O_3$. Strongly doped zirconium dioxide with a large concentration of $O^=$ vacancies is an excellent $O^=$ conductor at elevated temperatures and is well suited for use as a solid electrolyte. Porous Pt (paste or sputtered films) is used as the material for electrodes 12. Pt lead wires 15 (or other high temperature wire) are attached to each electrode with Pt paste so that the device may be connected to external circuitry. Using glass frit or ceramic glue 14, cells 11 are joined by a hollow, nonporous cylinder or tube 13. The cylinder material is not critical but must be able to withstand high temperature, be leak tight, and be capable of sealing to the zirconium dioxide wafers. A small hole can be drilled into the ceramic tube to allow an ambient atmosphere to leak into the enclosed volume for some applications. Alternately, the seals between the tube and the zirconium dioxide can be made somewhat leaky for the same purpose.

Electrochemical structure 10 works at elevated temperatures in excess of 500° C. where the zirconium dioxide is suitable conducting. Also, structure 10 must work in an oxygen containing gas environment which can vary from about 0.01% oxygen to about 10% oxygen at 1 atm total pressure. Typical operating conditions are an ambient atmosphere of 1% oxygen in nitrogen (total pressure of 1 atm) at 800° C. High temperature reduced the electrolyte resistance while oxygen supplies the active species. When a bias is applied to a zirconium dioxide cell 11, the current drawn is ionic and oxygen is withdrawn from the gas phase adjacent to the negative cathode and injected into the gas phase adjacent to the positive anode. The overall electrochemical reaction step occurring at each electrode is given by Equations (1) and (2).

Figure 8B:
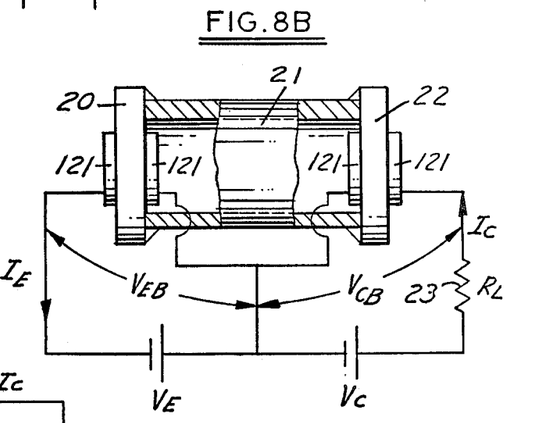
FIG. 8B is the connection of the electrochemical transistor shown in FIG. 8A in a common-base configuration.

Electrical operation can further be understood with the aid of FIG. 8B which shows the device wired in the common base configuration. The left cell or emitter 20 is forward biased by $V_E$ to emit oxygen from the ambient into the enclosed volume or base region 21. The right cell or collector 22 is reverse biased by $V_C$ through the load resistor 23, $R_L$, to collect the emitted oxygen and return it to the ambient.

In a manner analogous to that of an n-p-n semiconductor transistor, the emitter characteristic will be of the low-impedance type illustrated by FIG. 6 since the active species is withdrawn from a reservoir where the concentration is high. On the other hand the collector characteristic will have the saturated character of FIG. 5 because the steady-state flux of active species withdrawn from the base region (or equivalently, collector current) can be no greater than the flux injected by the emitter cell regardless of how large the collector bias $V_C$ (or the collector-base voltage, $V_{CB}$) becomes. Because the emitter and collector characteristics have the form described, the device can be said to exhibit transistor action and can be used to perform electrical functions common to transistors in the CB configuration.

The transport of the active species through the electrolytes is accomplished by ionic conduction. However, the transport of the neutral form of the active species through the base region is accomplished by atomic or molecular diffusion resulting from a concentration gradient of the species across the base region. In normal operation the concentration is higher near the inner electrode of the emitter cell, the region of injection, than near the inner electrode of the collector cell, the region of withdrawal.

Useful electrical functions, such as voltage amplification, could also be performed if the device were wired in CE or CC configurations. However, one function common to these configurations, namely ac curent amplification could not be accomplished unless the device is fabricated with a small aperature through which the neutral form of the active species can leak into the base region. The reason is that the current to be amplified in these modes must flow in the base electrode lead. Without leakage, no mechanism exists for a steady-state current to flow in this lead; that is, the neutral species can enter or leave the base region only by means of the emitter and collector cells so that in steady-state operation, the emitter and collector currents must be identical to the exclusion of any current in the base lead (see FIG. 4). This can be defeated by devising a leak of appropriate size so that a small flux of neutral species may leak into the base region from a surrounding reservoir as the neutral species is being withdrawn from the base region by the collector cell. The result is that the collector current exceeds the emitter current by an amount equal to the current in the base lead ($I_B = I_C - I_E$). A small modulation of $I_B$ as may be accomplished by a signal source in the base lead can then be amplified in conventional CE or CC configurations.

The physical processes which produce the steady state emitter and collector characteristics indicative of transistor action can be understood by successively considering three situations. First, emitter 20 is open circuited while oxygen leakage into the base region is considered negligible. Thus, for normal operation there is no means for oxygen to enter the base region. If the collector bias is applied, a transient current will be drawn while oxygen is pumped from the base. During the pump out, the collector cell 22 develops an electromotive force (EMF) given by the Nernst equation (Eq. (5)) appropriate for an oxygen concentration cell $$EMF = (RT/4F) \ln (P_{O_2}(\text{ambient})/P_{O_2}(\text{base})) \quad (5)$$

where R and R are the ideal gas and Faraday constants and T is the absolute temperature. The "4" is derived from the fact that four electrons are transferred between electrode and electrolyte during the electrochemical reaction step. $P_{O_2}$ (ambient) is the fixed ambient oxygen partial pressure while $P_{O_2}$ (base) is the partial pressure within the base which can be varied by the oxygen pumping action of either cell. Transient current flow stops when $P_{O_2}$ (base) has fallen to such a low value that the Nernst EMF exactly balances the applied voltage (EMF = $V_{CB} = V_C$). A voltmeter applied to the open emitter cell would register the same voltage. Note that steady state occurs when the flux of oxygen into the base equals the flux withdrawn so that for the present situation $I_C = O$, and the collector characteristic where $I_C$ is plotted against the collector-base voltage $V_{CB}$, is simply a straight line.

Figure 9:
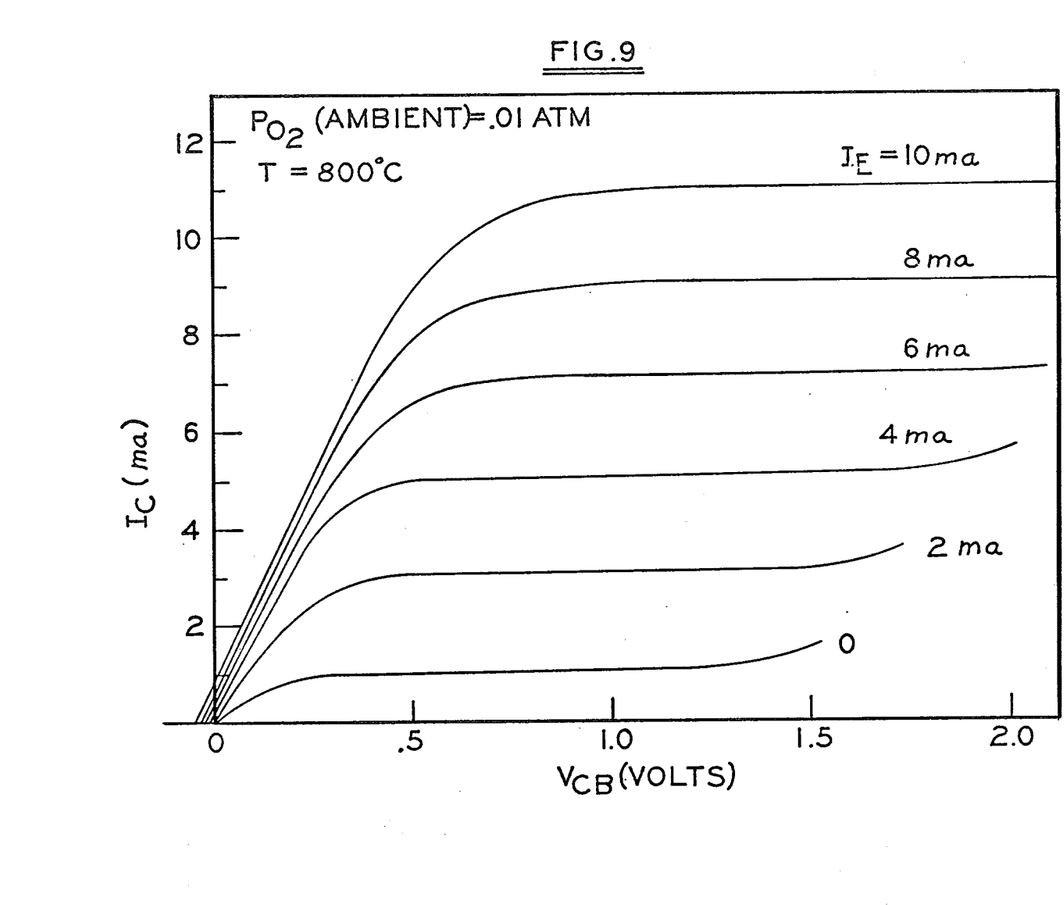
FIG. 9 is a graphical representation of the collector characteristic for the transistor as connected in FIG. 8B.

If oxygen leakage is allowed, the steady state collector current initially rises but then saturates as shown by the $I_E = O$ curve of the collector characteristic in FIG. 9. For this curve the rate at which oxygen leaks into the base equals the rate at wich it is withdrawn by the collector cell. The reason $I_C$ saturates is the resistance to the flux of oxygen offered by the inner electrode 121 (see FIG. 8B), or cathode, of the collector 22 cell. This is shown by the fact that the voltage at the open emitter 20 cell, which through the Nernst equation is acting as a sensor of $P_{O_2}$ (base), also rises and saturates when $I_C$ does. For the case shown, $V_{EB} \approx 0.12$ volts corresponding to $P_{O_2}$ (base) = $5.6 \times 10^{-5}$ atm. Such cathodic limiting currents are well established for Pt electrodes on zirconium dioxide fuel cells and electrolyzers.

The meaning of this result is that a large gradient in effective oxygen partial pressure or oxygen concentrations exists across the collector cathode at saturation. As a consequence the collector voltage drop can be given approximately by the following equation:

$$V_{CB} = I_C R_{EC} + (RT/4F) \ln (P_{O_2}(\text{base}) / P_{O_2}(\text{CB})) \quad (6)$$

which consists of the sum of an ohmic drop ($I_C R_{EC}$) where $R_{EC}$ is the collector electrolyte resistance (~50Ω), and a polarization EMF where $P_{O_2}$ (CB) is the effective oxygen pressure at the electrode-electrolyte interface of the collector cathode 121. In the region of saturation $P_{O_2}$ (CB) << $P_{O_2}$ (base). For this embodiment, the limitation to the transport of oxygen provided by the collector cathode is the principal source of the concentration gradient across the base region referred to earlier.

As $V_{CB}$ is further increased (to ~1.2 volts) $I_C$ eventually rises indicating breakdown. This occurs because the partial pressure of oxygen, $P_{O_2}$ (CB), drops sufficiently to reduce the electrolyte resulting in a degree of electronic conductivity. Initially this conductivity will develop only at the cathode surface of the electrolyte. This event is signalled by a precipitous rise in $V_{EB}$ (which had been nearly constant) to values ranging from 0.6-1.0 volts indicating that oxygen has been completely pumped from the base. It is believed that the induced electronic conductivity renders the entire electrolyte surface active for taking up oxygen thereby increasing the pumping rate and removing a portion of the electrode polarization. With a further increase of $V_{CB}$ electronic conductivity spreads throughout the electrolyte and $I_C$ rises. Eventually decomposition of the electrolyte would result. Operation in this region is poor due to long-term drifts in $I_C$ and $V_{CB}$.

Finally, if emitter 20 is "forward biased" oxygen injected into base 21 is collected leading to the complete collector characteristic of FIG. 9. As shown the saturated collector current is closely given by the sum of the emitter current and the leakage current. Note that as $I_E$ increases the $I_C = O$ intercept shifts to negative voltages. In this region base 21 is over-pressured $P_{O_2}$ (base) ~ $P_{O_2}$ (CB) < $P_{O_2}$ (ambient), and the emitted oxygen is forced out of the base retion through the leak. For a given leak rate, operation with high ambient $P_{O_2}$ leads to large leakage currents while for very low $P_{O_2}$, cathodic polarization of the emitter would limit $I_E$. The device can be operated as a small signal voltage amplifier as discussed previously. $V_C$ and $V_E$ are adjusted to establish an operating point in the region of collector current saturation. The load line is set by $R_L$. A small ac modulation of the emitter voltage $\Delta V_{EB}$, varies $P_{O_2}$ (base) which in turn produces a larger modulation, $\Delta V_{CB}$ of the collector voltage. The majority of the latter modulation occurs in the polarization EMF due to a substantial variation in $P_{O_2}$ (CB). Voltage gains (G $=\Delta V_{CB}/\Delta V_{EB}$) of 70 have been realized. A small signal parametrization of the common-base characteristics was done using hybrid parameters. For the case discussed, and choosing a typical operation point, one finds $\alpha_{fb}=(\Delta I_c / \Delta I_E)_{V_{CB}}=-1.00$ indicating that all of the emitted current is collected while $h_{ob}=(\Delta I_C / \Delta V_{CB})_{IE}=2\times 10^{-4}$ mhos shows the small slope of the saturated collector characteristic. The emitter input resistance $\mu_{ib}=(\nabla V_{EB} / \nabla I_E)_{V_{CB}} = 100\Omega$ is accounted for by the electrolyte resistance. The reverse amplification factor $\mu_{rb}=\Delta I_c / \Delta V_{CB})_{IE} = 10^{-2}$ is much larger than for Si transistors and reflects the fact that $P_{O_2}$ (base) is changing slightly in the region of $I_C$ saturation, and as a result, the Nernst component of $V_{EB}$ is affected.

Figure 10:
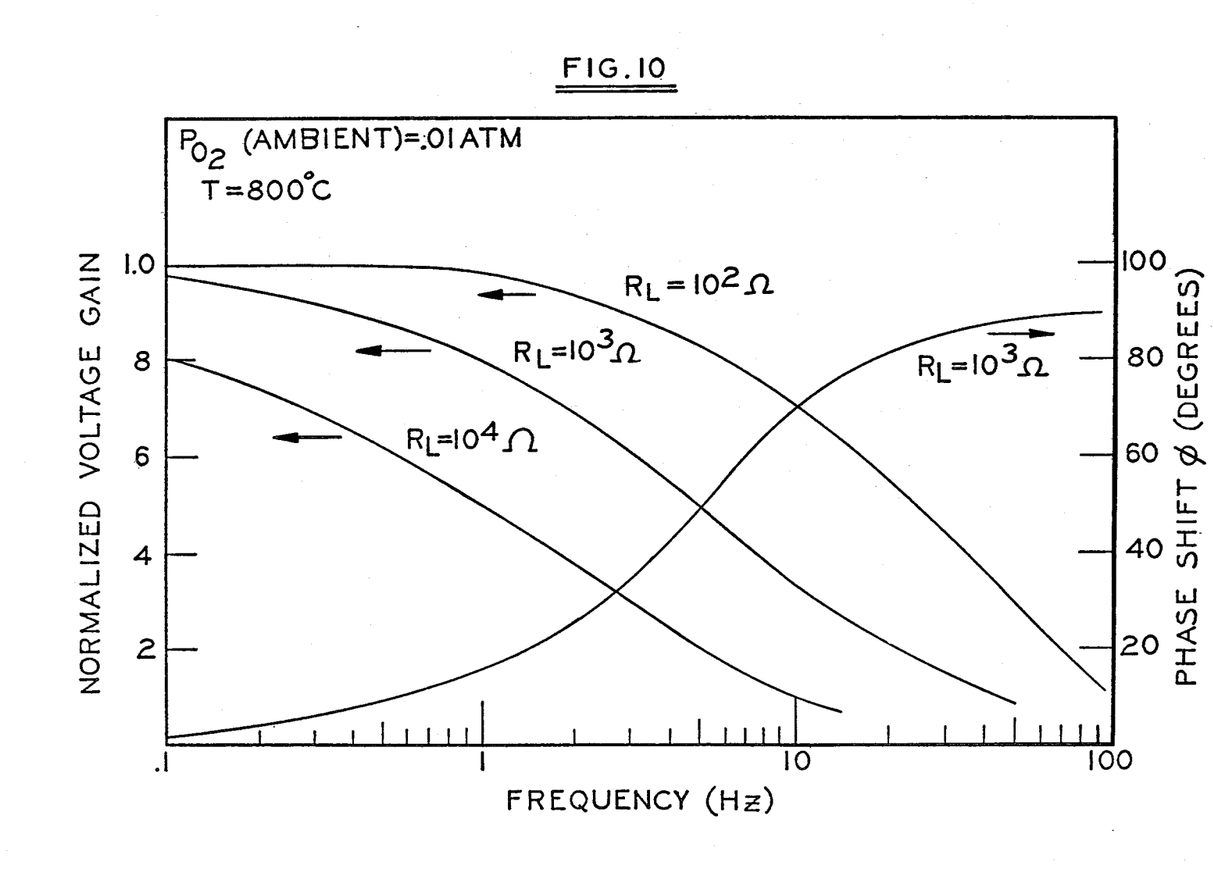
FIG. 10 is a graphical representation of a combined frequency plot of the normalized small signal voltage gain and the phase shift of the ac collector voltage relative to the ac emitter voltage for various $R_L$ values for the transistor as connected in FIG. 8B.

Voltage gain falls off with frequency and falls off more rapidly for larger values of $R_L$. FIG. 10 shows the normalized (to the zero frequency gain) ac voltage gain plotted against frequency for several values of $R_L$. Also shown is the phase angle $\phi$ by which the output lags the input. The main factor limiting frequency response appears to be the double layer capacity at base electrode 121 of collector 22. As the polarization EMF of collector 22 is modulated during operation, the double layer capacity is charged and discharged through $R_L$. The high value for this capacity, 100–200 $\mu f/cm^2$, is consistent with the low frequency response.

Figure 11:
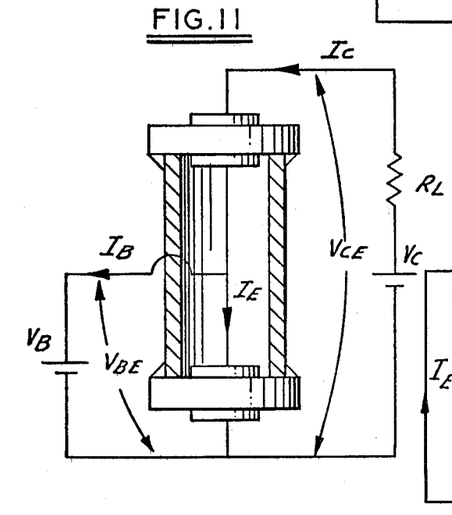
FIG. 11 is an electrochemical transistor as shown in FIG. 8A connected in a common-emitter configuration.

FIG. 11 shows the device wired in the common emitter configuration. In this mode voltage gains $G = \Delta V_{CE}/\Delta V_{BE}$ comparable to the previous case can be obtained. In the absence of leaks, the input impedance ($\Delta V_{BE}/\Delta I_B$) would be very high since the base lead should carry no steady state current as discussed previously. Low frequency operation would resemble that of a vacuum triode where the grid current is negligible. With leakage however, current amplification is possible as can be seen in the following manner. It is found that the leak rate can be characterized by the relation shown in the following equation (7) where A is an empirical constant which increases somewhat with temperature.

$$I_{leak} (O_2 \text{ molecules/sec}) = A (P_{O_2} \text{(ambient)} - P_{O_2}\text{(base)}) \quad (7)$$

Electrically, the leakage current $I_B$, is drawn through the base lead ($I_B$ (amps) $=4e\, I_{leak}$ where the factor $4e$, *being the electronic charge, converts the leakage flux in $O_2$ moleculea per sec to amps*) and the collector cell (as is also the case for the common-base mode). As $V_B$ is modulated about its operating point, $P_{O_2}$ (base) is varied which through equation (7) produces a small change in the leak rate and $I_B$. At low frequencies an ac current gain $\alpha_{fe}$ (more commonly $\beta$) $=(\Delta I_C/\Delta I_B)_{V_{CB}} = 100$ can be observed where the base input resistance $h_{ie} =(\Delta V_{BE}/ \Delta I_B)_{V_{CE}} = 2 \times 10^4 \Omega$. These values vary with $P_{O_2}$ (ambient) which sets the maximal leak rate. A similar current gain can be obtained in the common-collector configuration.

Figure 12:
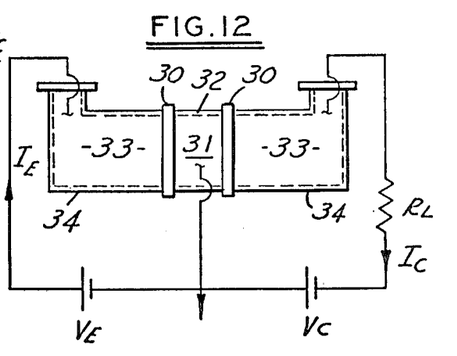
FIG. 12 is a schematic diagram of an electrochemical transistor connected in the common-base configuration in accordance with another embodiment of this invention wherein liquid Hg can serve as the base material, the reservoir for the active species in neutral form, and also the electrodes for the collector and emitter cells.

As noted previously the present concept for an electrochemical transistor is general and not limited to zirconium dioxide solid electrolyte structures. An alternate solid electrochemical system would use ceramic sodium beta alumina as the electrolyte and Na+ ions as the active chemical species. With reference to FIG. 8A, disks 11 would be made of sodium beta alumina and electrodes 12 would be made of sputtered Sn or Mo. The device would operate in a high temperature atmosphere containing a substantial concentration of Na vapor. An alternate structure employing sodium beta alumina is shown in FIG. 12 where electrolyte disks 30 bracket a base region containing liquid Hg as base material 31. It is well known that sodium can be electrochemically injected or withdrawn from mercury which can take up large concentrations of sodium to form sodium-mercury amalgams. An appropriate tubing material 32 is necessary to complete the containment of the liquid amalagam in the base region. The outer faces of each electrolyte disk 30 are exposed in a similar fashion to reservoirs 33 of Na amalgamated with Hg in appropriate containers 34. Mercury, a good electronic conductor can simultaneously serve as the electrode material. Note that the polarities of the batteries in the external circit have been reversed from those of FIG. 8B to allow proper operation for an electrolyte which conducts positive rather than negative ions.

The general beta alumina material can be chemically adapted to conduct numerous other atomic species other than sodium, including among them K, Li, Ag. Since many of these same elements can be amalgamated with mercury, the structure shown in FIG. 12 could, in this manner be applicable to numerous other electrochemical systems.

This approach to transistor action can also be extended to liquid electrolytes. For example, the emitter and collector cells of FIG. 8A could be replaced by volumes of liquid electrolyte such as diluted sulfuric acid with members of Pt as electrodes. Each cell has one inner electrode and one outer electrode. The two outer electrodes of each cell can be exposed to hydrogen gas which can be taken up or expelled by the electrolyte at the electrodes. The gaseous regions surrounding the inner electrodes (which are electrically shorted) can be connected by a tube of appropriate shape to define a volume (base region) enclosing the two inner electrodes. Using standard external circuitry, transistor operation can be accomplished with an accompanying flux of hydrogen between the hydrogen reservoirs surrounding the outer emitter and collector electrodes.

Figure 13:
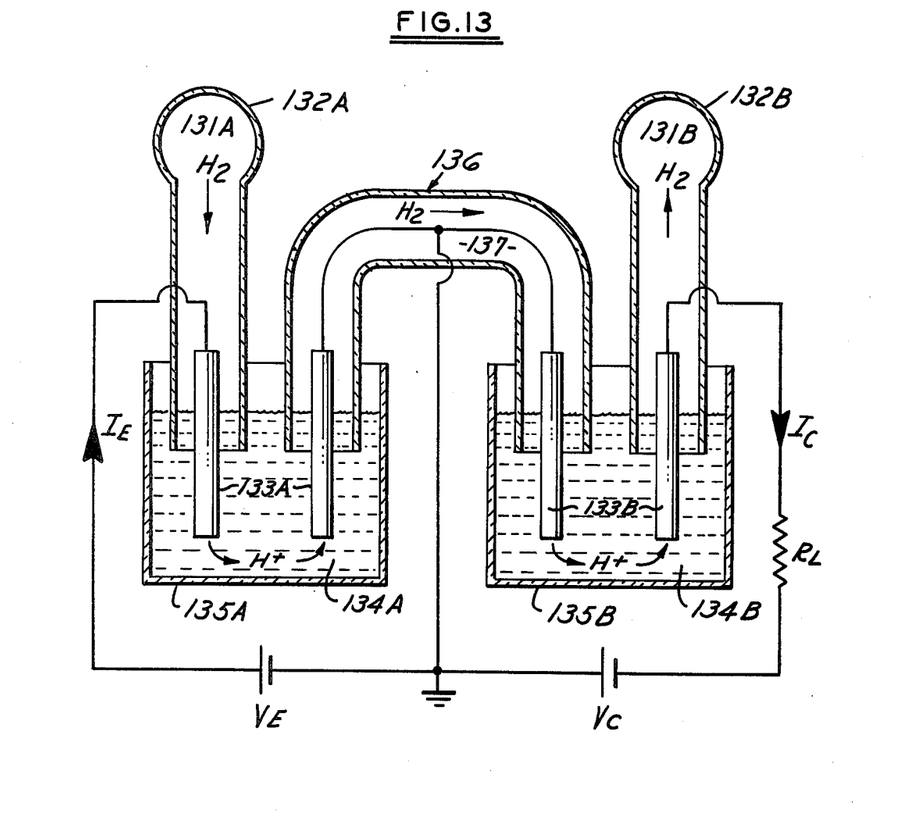
FIG. 13 is a schematic diagram of an electrochemical transistor with liquid electrolyte cells having hydrogen ($H_2$) as the neutral form of the active species and sulfuric acid as the liquid electrolyte.

Referring to FIG. 13, there is shown a schematic diagram of a liquid electrolyte transistor using hydrogen ($H_2$) as the neutral form of the active species. Two liquid electrolyte containers 135A and 135B contain a liquid electrolyte 134A and 134B such as dilute sulfuric acid. Typical material for the containers 135A and 135B is glass. Hydrogen gas containers 132A and 132B each have an opening which is inserted into liquid electrolyte 134A and 134B, respectively. Contained within hydrogen gas containers 132A and 132B is hydrogen gas which is the reservoir for the conductive species in a neutral form. A container 136 made from a material such as glass tubing extends between liquid electrolytes 134A and 134B. Inside container 136 is an enclosed base volume 137. A pair of conducting electrodes 133A extend from the opening of gas conatiner 132A into electrolyte 134A and from the opening of container 136 into electrolyte 134A. Similarly, a pair of conducting electrodes 133B extend from the opening of container 132B into electrolyte 134B and from the opening of container 136 into electrolyte 134B.

A wire extends within container 136 to connect one of the contained electrodes 133A and 133B. A battery $V_E$ is connected between the conducting wire in container 136 and electrode 133A in container 132A. The series combination of a battery $V_C$ and a resistor $R_L$ are connected in series between electrode 133B in container 132B and the connecting wire in container 136. The connecting wire in container 136 is grounded.

Such a connection produces transistor action characteristic of the common base mode. The emitter cell is formed of electrodes 133A, liquid electrolyte 134A and liquid electrolyte container 135A. The collector cell is formed of electrodes 133B, liquid electrolyte 134B and liquid electrolyte container 135B. FIG. 13 shows the motion of $H_2$ from the emitter cell reservoir through the collector cell reservoir during normal operation. When the hydrogen enters the liquid electrolyte it is in the form of $H+$ ions which flow between the electrodes of a cell. Gaseous $H_2$ leaves container 132A and enters electrolyte 134A. The corresponding $H+$ ions are transferred between electrodes 133A and enter the base volume 136 as $H_2$ gas. $H_2$ gas flows in container 136 and enters the collector cell electrolyte 134B. The corresponding $H+$ ions are transferred between electrodes 133B and eventually enter the container 132B as $H_2$ gas.

Various modifications and variations will no doubt occur to those skilled in the various arts to which this invention pertains. For example, the particular geometric configuration may be varied from that disclosed herein. These and all other variations which basically rely on the teachings through which this disclosure has advanced the art are properly considered within the scope of this invention.

What I claim is:

1. An electrochemical structure having a collector region, an emitter region and a base region which are arranged with respect to one another so as to facilitate transistor action and each of said collector emitter and base regions having electrodes in communication with reservoirs of an appropriate active species in electrically neutral form so that said electrochemical structures exhibits electrical characteristics and features commonly known as transistor action and can be used to provide alternating current voltage, current and power gain;

said collector and emitter regions each containing liquid electrolyte with two coupled electrodes to form a collector and an emitter electrochemical cells, respectively, suitable to conduct said appropriate active species available from the reservoirs adjacent to said collector and emitter electrochemical cells;

said base region being an enclosed region which can take up the electrically active species in neutral form;

said emitter and collector electrochemical cells each having one electrode exposed to the active species in neutral form in said base region;

the other electrode of each of said emitter and collector electrochemical cells being exposed to the reservoir of the active species in neutral form;

said electrochemical cells being adapted so that transistor action can occur when there is electrochemical withdrawal of the active species from the reservoir adjacent to said emitter electrochemical cell and there is injection of the active species into said base region, while simultaneously the action of said collector electrochemical cell will be to withdraw the active species injected into said base region and deliver it to the reservoir adjacent to said collector electrochemical cell; and said reservoir adjacent to one electrode of each of said collector and emitter electrochemical cells shall, when the neutral form of the active species is a gas, be a space or a region for containing the gas.

2. An electrochemical structure as recited in claim 1 wherein the ionically conducting material of said electrochemical cells is sulfuric acid and is adequate for the conduction of $H+$ ions, where said electrodes include electrically continuous, plates of Pt, and where the active species in neutral form is gaseous hydrogen.

3. An electrochemical structure as recited in claim 2 wherein said base region has a volume defined in part by a hollow tube of arbitrary cross section having one end immersed in the electrolyte of said emiter electrochemical cell and the other end immersed in the electrolyte of said collector electrochemical cell and one electrode from each of said emitter and collector electrochemical cells being immersed in the liquid electrolyte and extending into said enclosed region.

4. An electrochemical structure as recited in claim 3 further comprising external circuitry attached to the electrodes of said electrochemical structure, said external circuitry being adapted to be adjusted to cause said electrochemical structure to exhibit transistor action and cause hydrogen gas to be withdrawn from the reservoir adjacent to said emitter electrochemical cell and injected into said base region while injected hydrogen gas is being withdrawn from said base region by said collector electrochemical cell and delivered to the reservoir adjacent to said collector electrochemical cell.

5. An electrochemical structure having a collector region, an emitter region and a base region which are arranged with respect to one another so as to facilitate transistor action and each of said collector, emitter and base regions having electrodes in communication with reservoirs of an appropriate active species in electrically neutral form so that said electrochemical structure exhibits electrical characteristics and features commonly known as transistor action and can be used to provide alternating current voltage, current and power gain;

said collector and emitter regions each containing dilute sulfuric acid electrolyte and two platinum electrodes to form a collector and an emitter electrochemical cell, respectively, suitable to conduct hydrogen ions as an appropriate active species available from reservoirs of hydrogen gas adjacent to said collector and emitter electrochemical cells;

said reservoirs being two glass containers each having an opening adjacent to one electrode of each of said collector and emitter electrochemical cells so as to contain hydrogen gas;

said base region being an enclosed glass tube extending from one of the platinum electrodes immersed in the electrolyte of the emitter cell to one of the platinum electrodes immersed in the electrolyte of the collector cell and passing the active species from the emitter to the collector as hydrogen gas; and said electrochemical cell being adapted so that transistor action can occur when there is electrochemical withdrawal of the hydrogen from the hydrogen reservoir adjacent the emitter electrochemical cell and there is injection of hydrogen gas into said base region, while simultaneously the action of said collector electrochemical cell is to withdraw the hydrogen gas injected into the base and deliver it to the hydrogen reservoir adjacent to said collector electrochemical cell, delivery being accomplished as a hydrogen ion.

* * * * *